No. 617,826. Patented Jan. 17, 1899.
D. M. BOYLAN.
DRAFT EQUALIZER.
(Application filed Sept. 10, 1898.)
(No Model.)
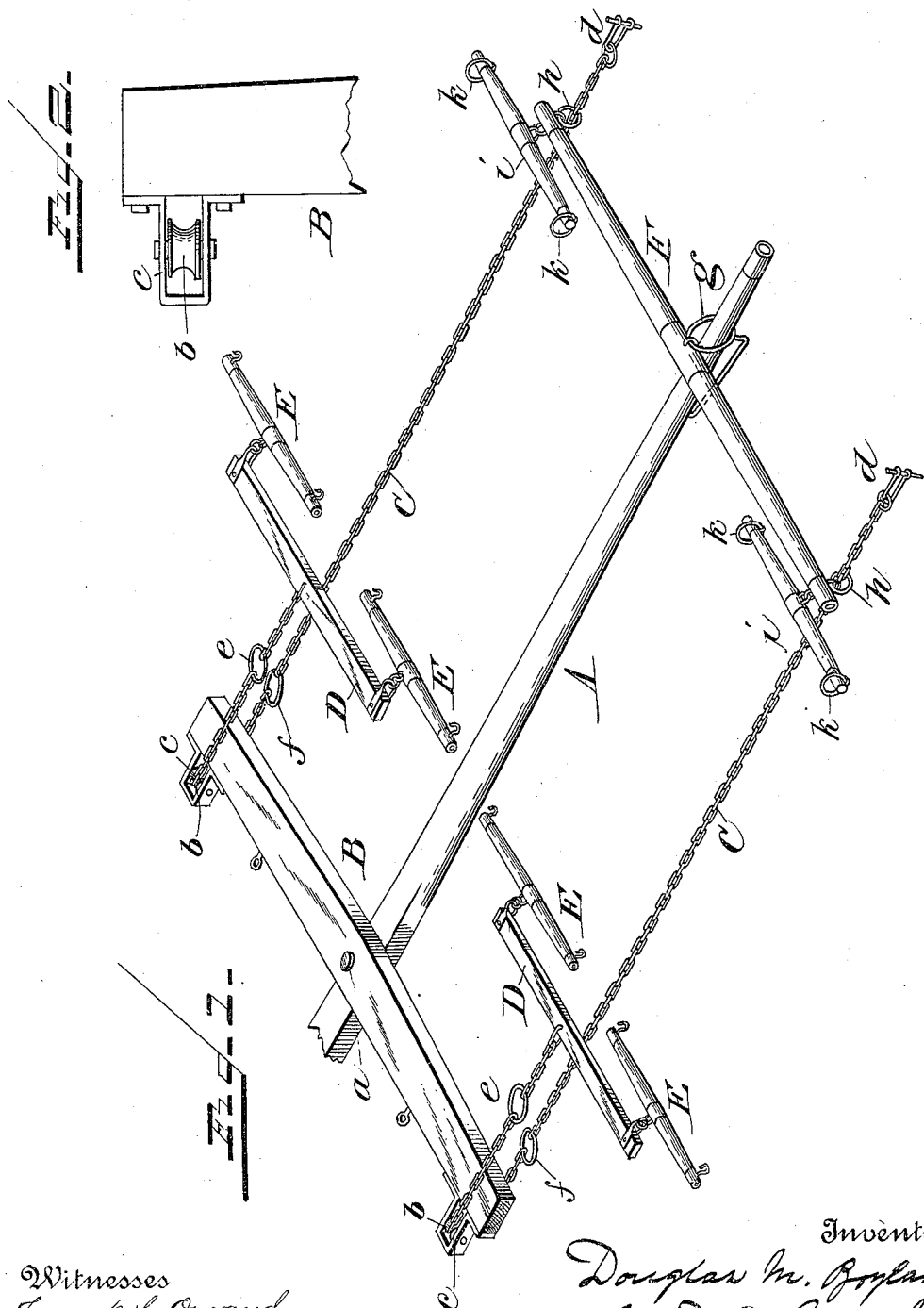
Witnesses
Franck L. Ourand.
W. Parker Reinohl.
Inventor
Douglas M. Boylan.
By D. P. Reinohl.
Attorney

UNITED STATES PATENT OFFICE.

DOUGLAS MENROE BOYLAN, OF BRISTOW, IOWA.

DRAFT-EQUALIZER.

SPECIFICATION forming part of Letters Patent No. 617,826, dated January 17, 1899.

Application filed September 10, 1898. Serial No. 690,660. (No model.)

*To all whom it may concern:*

Be it known that I, DOUGLAS MENROE BOYLAN, a citizen of the United States, residing at Bristow, in the county of Butler and State of Iowa, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers for vehicles, machines, and agricultural implements drawn by animals, has especial reference to that class of vehicles or machines requiring two sets of double teams, or eight animals arranged in pairs, one pair in front of the other on each side of the tongue, and all may be compelled to pull equally upon the load; and it consists in certain improvements in construction, which will be fully disclosed in the following specification and claims.

In the accompanying drawings, which form part of this specification, Figure 1 is a perspective of my improved equalizer; and Fig. 2, a top plan, on an enlarged scale, of one end of the evener.

Reference being had to the drawings and the letters thereon, A indicates the tongue or pole; and B, the evener, which is pivotally secured to the pole in the longitudinal center of the evener by a bolt $a$, and is provided at each end and on the rear edge with a sheave or pulley $b$, supported in the frame $c$, secured to the evener.

C C are the draft-chains, adapted at both ends to be connected to doubletrees D D, the front doubletrees being omitted from the drawings, only the clevis $d$ being shown at the front end of each chain. The chains extend beyond the rear team or the tongue and are provided near the rear end with deadrings $e$ $f$, which serve to engage with the frame of the sheaves or pulleys $b$ as one team draws more than its appropriate share of the load and prevents said team doing more than its share of the work. Each doubletree is provided with a singletree E at each end thereof.

F indicates the neck-yoke, which is provided with a loop $g$ in the longitudinal center to support the front end of the tongue, loops $h$ $h$ at each end, which support the draft-chain near its front end, and with breast-bars $i$ $i$, having rings $k$ $k$ at each end to receive the breast chain or strap of each animal of the rear teams. The draft-chains are thus prevented sagging or dragging on the ground and are kept out of the way of the rear animals. The draft-chains may pass from the rear doubletrees over or under the end of the evener and engage the sheave or pulley. The neck-yoke is of a length to distribute the weight of the tongue upon the four rear animals, thus requiring comparatively little weight to be supported by each animal.

I disclaim an eight-horse equalizer comprising a lever or evener-bar adapted to be pivotally connected to a tongue or pole, pulleys connected to said lever or evener-bar adjacent to the ends thereof, doubletrees arranged one in front of the other in pairs disposed at opposite sides of the tongue or pole, chains connecting the front and rear trees and passing around the pulleys, and stops on the chains for limiting the movement thereof.

Having thus fully described my invention, what I claim is—

1. In combination with a tongue or pole, an evener pivotally connected thereto, a draft-chain movably connected to the evener near each end thereof, extending beyond the rear team and provided with a doubletree at each end of the chain, a neck-yoke provided with a bar at each end, a center loop for the tongue, and loops at each end of the yoke for supporting the draft-chains.

2. In combination with a tongue or pole, an evener pivotally connected thereto and provided with sheaves near each end thereof, a draft-chain passing over or around each sheave and provided with a doubletree at each end, and a neck-yoke supporting the tongue and the draft-chains, and provided with a bar at each end for attaching the animals of the front team thereto.

3. In combination with a tongue or pole, an evener pivotally connected thereto in the longitudinal center of the evener and provided with a sheave near each end, draft-chains engaging said sheaves, extending beyond the rear team and provided with a doubletree at each end, and a neck-yoke having a loop to engage the tongue and loops to engage the draft-chains.

In testimony whereof I affix my signature in presence of two witnesses.

DOUGLAS MENROE BOYLAN.

Witnesses:
E. A. JONES,
JOSEPH MERRILL.